(12) United States Patent
Ishii (10) Patent No.: US 11,531,323 B2
(45) Date of Patent: Dec. 20, 2022

(54) NUMERICAL CONTROL SYSTEM OF INDUSTRIAL MACHINE

(71) Applicant: FANUC CORPORATION, Yamanashi (JP)

(72) Inventor: Tooru Ishii, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 355 days.

(21) Appl. No.: 16/817,139

(22) Filed: Mar. 12, 2020

(65) Prior Publication Data

US 2020/0293026 A1 Sep. 17, 2020

(30) Foreign Application Priority Data

Mar. 14, 2019 (JP) .............................. JP2019-047161

(51) Int. Cl.
*G05B 19/416* (2006.01)
(52) U.S. Cl.
CPC .. *G05B 19/416* (2013.01); *G05B 2219/34311* (2013.01); *G05B 2219/41112* (2013.01)
(58) Field of Classification Search
CPC ........ G05B 19/416; G05B 2219/34311; G05B 2219/41112
USPC .................................. 318/560, 569; 700/170
See application file for complete search history.

(56) References Cited

U.S. PATENT DOCUMENTS

| | | | | |
|---|---|---|---|---|
| 4,988,935 A * | 1/1991 | York | ................ | G05B 19/232 318/568.18 |
| 7,750,592 B2 * | 7/2010 | Eguchi | ................ | G05B 13/042 318/632 |
| 10,228,676 B2 * | 3/2019 | Etou | ................ | G05B 19/402 |

FOREIGN PATENT DOCUMENTS

| | | |
|---|---|---|
| JP | S61-230917 A | 10/1986 |
| JP | S62-207621 A | 9/1987 |
| JP | H01-209974 A | 8/1989 |
| JP | 2002-328707 A | 11/2002 |
| JP | 2007-293715 A | 11/2007 |
| JP | 2010176375 A | 8/2010 |

(Continued)

OTHER PUBLICATIONS

An Office Action; "Notice of Reasons for Refusal", mailed by the Japanese Patent Office dated Aug. 31, 2021, which corresponds to Japanese Patent Application No. 2019-047161 and is related to U.S. Appl. No. 16/817,139; with English language translation.

*Primary Examiner* — David Luo
(74) *Attorney, Agent, or Firm* — Studebaker & Brackett PC (57) ABSTRACT

Provided is a numerical control system of an industrial machine that makes it possible to eliminate overshoot occurred at the time of stopping, thereby preventing interference of the machine, for example, in a case in which the torque of a motor such as a servomotor used in a feed axis of a machine tool is limited by a command unit of a CNC. A numerical control system of an industrial machine includes a command unit and a control unit configured to control driving of a motor of the industrial machine in accordance with a command from the command unit, and to perform position control by receiving a command of an end point position from the command unit or without receiving a command of the end point position from the command unit, and the control unit includes an in-deceleration torque limit release unit that, in a case of performing torque limitation of the motor, releases the torque limitation only during deceleration.

2 Claims, 8 Drawing Sheets

(56) References Cited

FOREIGN PATENT DOCUMENTS

JP    2016-124078 A    7/2016

* cited by examiner

NUMERICAL CONTROL SYSTEM OF INDUSTRIAL MACHINE

This application is based on and claims the benefit of priority from Japanese Patent Application No. 2019-047161, filed on 14 Mar. 2019, the content of which is incorporated herein by reference.

BACKGROUND OF THE INVENTION

Field of the Invention

The present invention relates to a numerical control system of an industrial machine.

Related Art

As is well known, in the field of machine tools, by applying CNC (Computer Numerical Control) technology to numerically control the moving amount, moving speed, etc. of the tools by a computer, repetition of the same machining procedure, machining of complicated shapes, etc. are highly automated.

On the other hand, the CNC has a function to limit the torque of the servo motor used as a feed axis, and this function limits the torque during test driving or manual operation of the machining program so that the damage in the case of machine interference due to unexpected operation can be minimized. Furthermore, according to a function such as reference point setting with a mechanical stopper, even in the case of intentionally pressing the machine to the stopper, the impact at the time of abutting is suppressed by the torque limit.

For example, Japanese Unexamined Patent Application, Publication No. 2010-176375 discloses providing a torque limit to the X-axis motor of the machine tool.

Patent Document 1: Japanese Unexamined Patent Application, Publication No. 2010-176375

SUMMARY OF THE INVENTION

Figure 8:
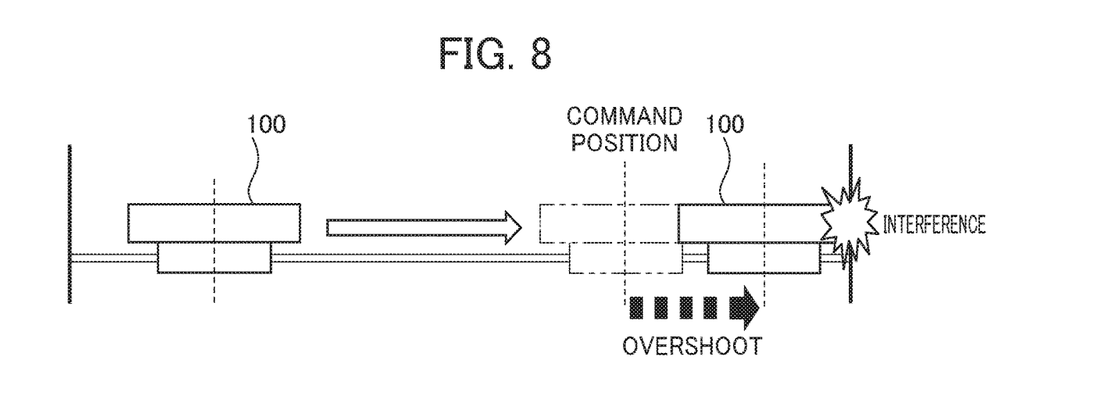
FIG. 8 is a diagram showing a situation in which interference occurs due to overshoot.
Figure 9:
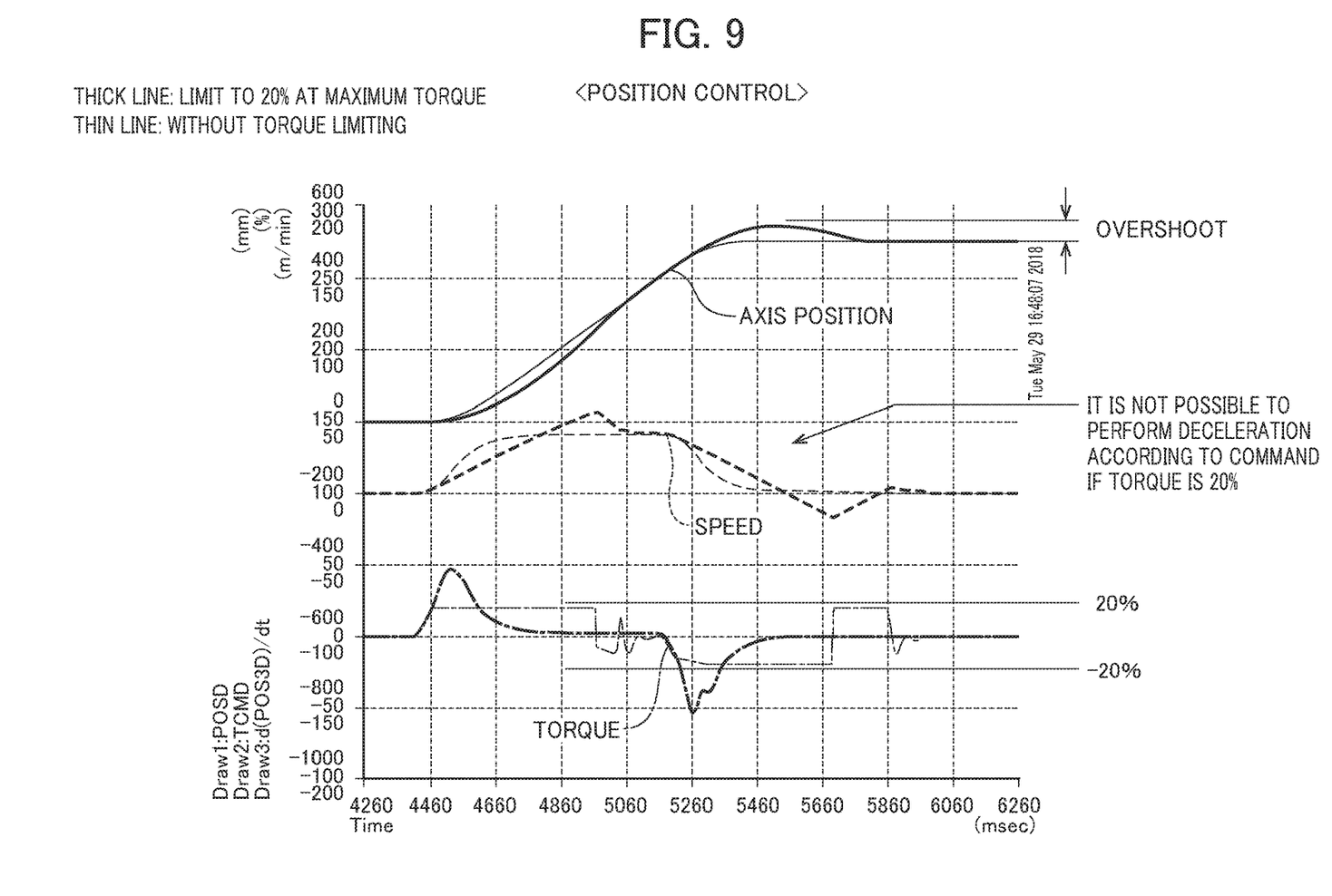
FIG. 9 is a diagram used in an explanation for the occurrence of overshoot.

However, as shown in FIGS. 8 and 9, for example, when the torque capable of limiting the torque of the servo motor of the feed axis of the table 100 so that the torque which can be outputted is reduced, the torque required during acceleration or deceleration may be insufficient. Therefore, the acceleration decreases, and the moving distance required to reach the commanded speed is increased accordingly, or the deceleration distance lengthens and the motion cannot be stopped at the command position which may cause overshoot, leading to interference with other members of the table 100.

Figure 3:
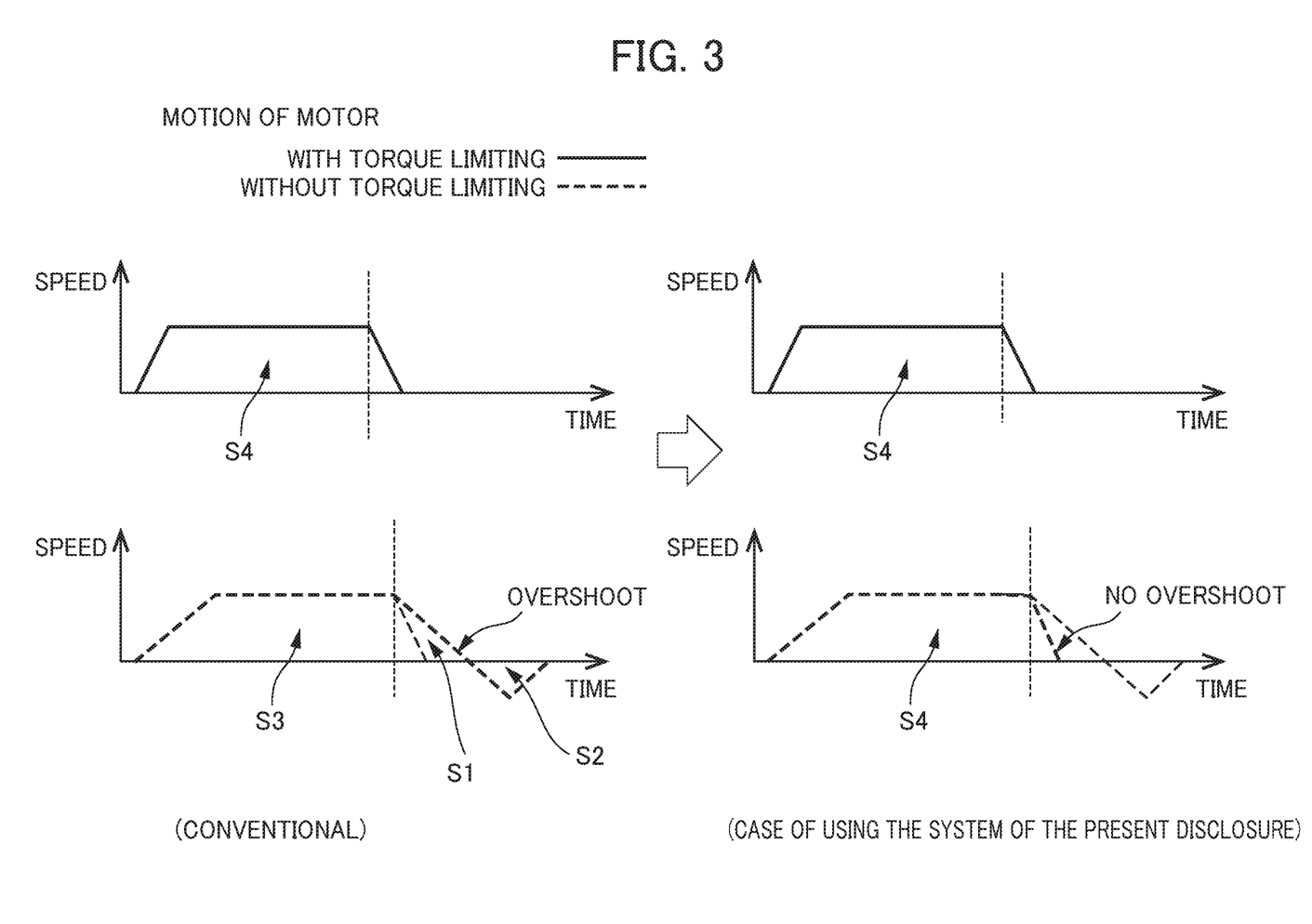
FIG. 3 is a view used in an explanation of preventing overshoot using the numerical control system for the industrial machine according to the first embodiment.

Herein, the upper left graph of FIG. 3 shows the movement of a motor without torque limit (table 100) in relation to speed and time, and the lower left graph of FIG. 3 shows the movement of the motor with torque limit (table 100) in relation to speed and time when overshoot occurs. In the lower left graph of FIG. 3, the area of the portion denoted by the reference symbol S1 represents the distance of the overshoot, and the area of the portion denoted by the reference symbol S2 represents the returned distance returned by the amount of the overshoot. Furthermore, the area of the portion denoted by the reference symbol S3 before the start of deceleration (moving distance) is the same as the area of the portion denoted by the reference symbol S4 before the start of deceleration without torque limit in the upper left graph of FIG. 3 (moving distance).

In addition, since the position control is performed by using a servomotor, in a case in which the motion passes through the command position, it will perform return control until the command position.

In addition, in a case in which the torque of the servomotor is limited by the CNC, there are also cases where acceleration or deceleration according to the command cannot be performed depending on the magnitude of the limit value of the torque. In other words, there are cases in which the limit value of torque is reached and acceleration or deceleration according to the command cannot be performed. In such a case, the deviation (position deviation) between the command position and the actual position becomes large, and an alarm of an excessive error occurs. Therefore, in a case in which the torque limitation is performed, there are disadvantages in that it is necessary to prevent the occurrence of such an alarm caused by the excessive error by taking measures such as slowing the feed speed of the table 100 or increasing the allowable value of the position deviation.

According to an aspect of the present disclosure, a numerical control system of an industrial machine includes: a command unit; and a control unit configured to control driving of a motor of the industrial machine in accordance with a command from the command unit, and to perform position control by receiving a command of an end point position from the command unit or without receiving a command of the end point position from the command unit, in which the control unit includes an in-deceleration torque limit release unit that, in a case of performing torque limitation of the motor, releases the torque limitation only during deceleration.

Furthermore, according to another aspect of the present disclosure, a numerical control system of an industrial machine includes a command unit; and a control unit configured to control driving of a motor of the industrial machine in accordance with a command from the command unit, and to perform position control by receiving a command of an end point position from the command unit, in which the control unit includes: an acceleration/deceleration time constant calculation unit that, in a case of performing torque limiting of the motor, performs acceleration/deceleration at an outputtable torque after torque limiting, and calculates a time constant of acceleration/deceleration for securing the position control; and a time constant setting unit that, in a case of performing the torque limiting of the motor, automatically sets the time constant of the acceleration/deceleration calculated by the acceleration/deceleration time constant calculation unit before driving the motor.

According to the above-described embodiment of the present disclosure, in a case in which the torque of a motor such as a servomotor used with the feed axis of a machine tool is limited by the command unit of the CNC, for example, it is possible to eliminate the overshoot occurring at the time of stopping, thereby preventing interference of the machine.

DETAILED DESCRIPTION OF THE INVENTION

Hereinafter, a description will be given of a numerical control system of an industrial machine according to a first embodiment with reference to FIGS. 1 to 3.

Here, in the description of the present embodiment, the industrial machine shall be a machine tool. However, the industrial machine according to the present invention may be other industrial machines such as a robot, PLC, a conveyer, a measuring machine, a testing machine, a press, an indenter, a printing machine, a dicasting machine, an injection molding machine, a food processing machine, a packaging machine, a welding machine, a washing machine, a coating machine, an assembly machine, a mounting machine, a woodworking machine, a sealing machine or a cutting machine.

Figure 1:
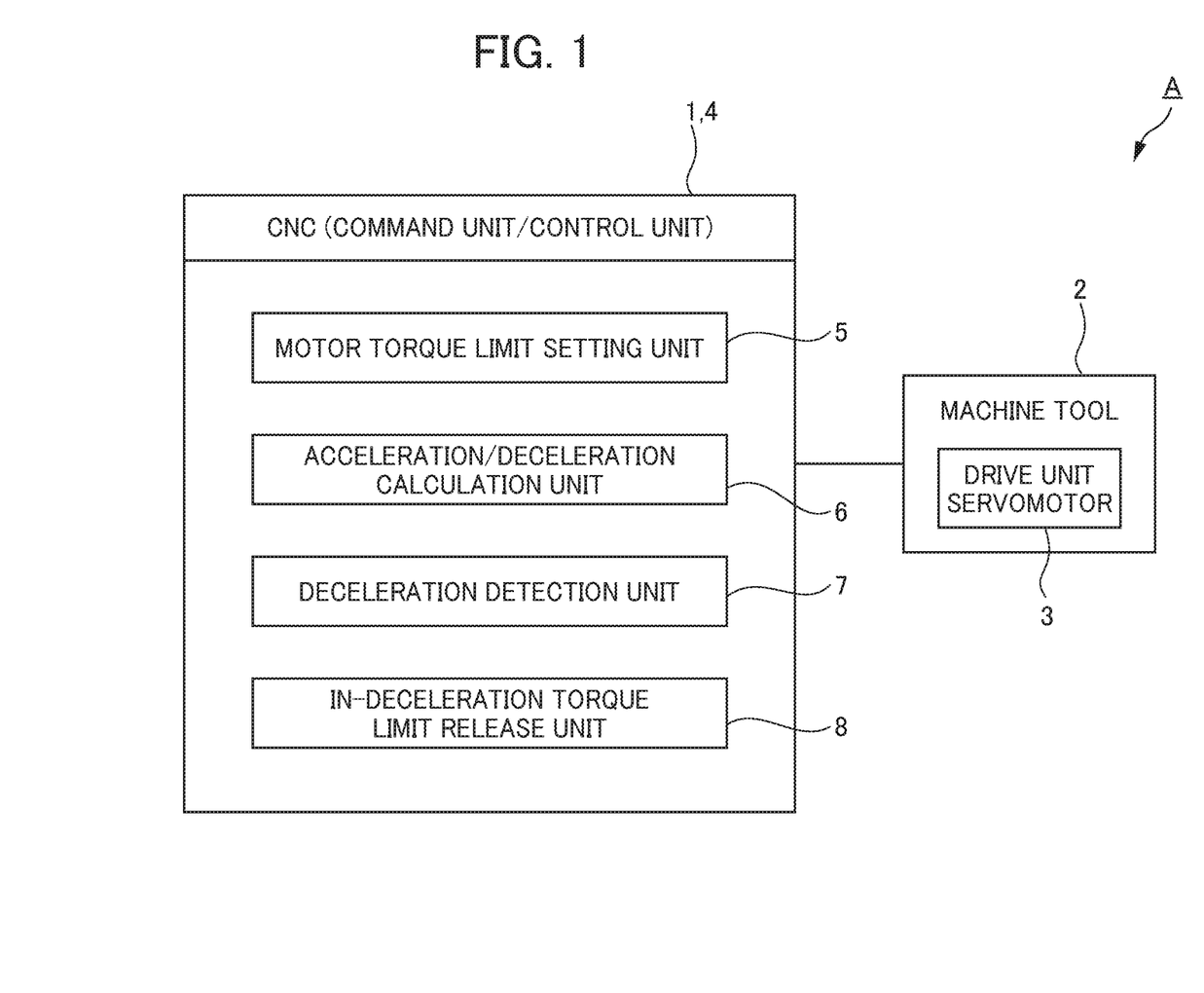
FIG. 1 is a block diagram showing a numerical control system for an industrial machine according to a first embodiment.

As shown in FIG. 1, a control system A of the machine tool according to the present embodiment includes a CNC 1 of a command unit, and a control unit 4 for controlling a drive unit 3 of the machine tool 2 on the basis of a command from the CNC 1.

In the present embodiment, the CNC 1 is configured to include the control unit 4, and the drive unit 3 is, for example, a motor such as a servomotor for driving a feed axis of a table 100. In a case in which the control unit 4 is provided separately from the CNC 1, for example, the control unit 4 may be a servo amplifier or the like.

On the other hand, as shown in FIG. 1, the control unit 4 of the control system A of the machine tool according to the present embodiment includes: a motor torque limit setting unit 5 for setting a torque limit of a motor 3; an acceleration/deceleration calculation unit 6 for calculating the acceleration/deceleration of the motor 3 and thus the table 100; a deceleration detection unit 7 for detecting a deceleration state of the motor 3 and thus the table 100; and an in-deceleration torque limit release unit 8 that releases the torque limit only during deceleration in a case in which the torque limit of the motor 3 is performed.

Figure 2:
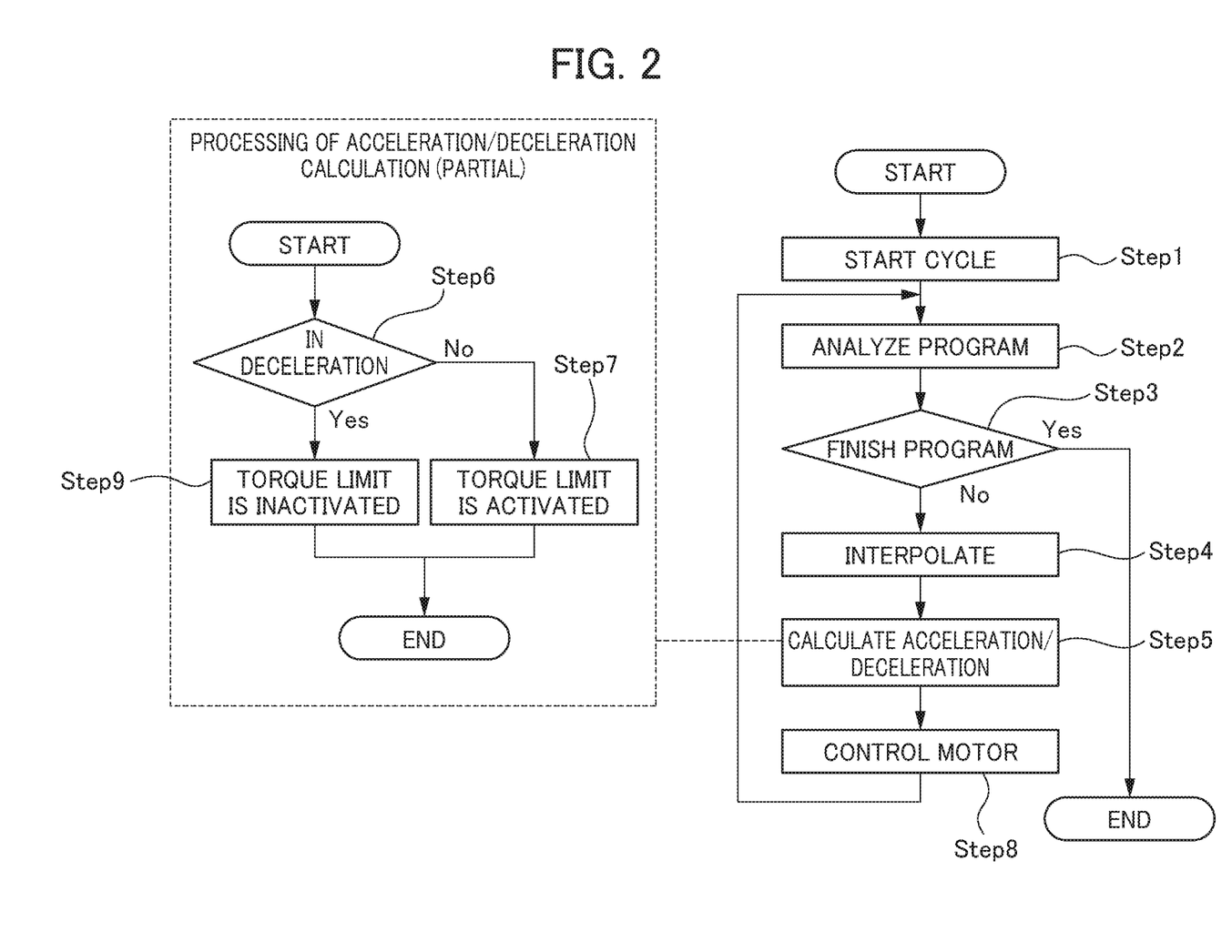
FIG. 2 is a flow diagram showing a control method using the numerical control system for the industrial machine according to the first embodiment.

Furthermore, as shown in FIG. 2, in a case in which the control system A of the machine tool according to the present embodiment controls the drive unit 3 of the machine tool 2, when a cycle starts on the basis of a command from the CNC 1 (Step 1), analysis of the NC program (confirmation of progress) is performed (Step 2), and it is confirmed whether or not the program has been completed (Step 3).

In a case in which the program has not been finished, interpolation (Step 4) and calculation (Step 5) of the acceleration/deceleration of the motor by the acceleration/deceleration calculation unit 6 are performed.

Furthermore, the deceleration detection unit 7 confirms whether the deceleration of the motor has started on the basis of the calculation result of the acceleration/deceleration calculation unit 6 (Step 6), and in a case in which deceleration has not been detected, the torque limit set by the motor torque limit setting unit 5 is kept enabled (Step 7), and the control of the motor 3 is performed (continue: Step 8).

In a case in which the deceleration detection unit 7 detects the deceleration of the motor 3, the in-deceleration torque limit release unit 8 releases the torque limit set by the motor torque limit setting unit 5 (Step 9). Thereafter, during the deceleration, the motor control is performed in a state in which the torque limit is released (Step 8).

In the control system A of the machine tool of the present embodiment, in a case of performing the position control (rapid traverse or cutting feed) by commanding the end point position in a program, or in a case of performing position control (manual operation) without commanding the end point position, while the deceleration of the motor 3 is detected as described above, the in-deceleration torque limit release unit 8 releases the torque limit set by the motor torque limit setting unit 5.

With such a configuration, in the control system A of the machine tool according to the present embodiment, as shown in the lower right graph of FIG. 3, the torque limit is released only during deceleration so that 100% of the torque can be outputted, and as in the case of no torque limit in the upper right graph of FIG. 3, 100% of the torque can be outputted during deceleration. Therefore, it is possible to stop the motion at the command position without overshooting.

Therefore, according to the control system A of the machine tool according to the present embodiment, in a case in which the torque of the motor 3 such as a servomotor used in the feed axis of the machine tool 2 is limited by the command unit of the CNC 1 automatically or manually, it is possible to eliminate the overshoot occurred at the time of stopping, thereby reliably preventing the interference of the machine.

Although the first embodiment of the numerical control system of the industrial machine has been described above, the present invention is not limited to the above-described embodiment, and can be appropriately modified within the scope not departing from the spirit thereof.

Next, a description will be given of a numerical control system of an industrial machine according to the second embodiment with reference to FIGS. 4 to 7.

Here, even in the present embodiment, similarly to the first embodiment, eliminating the overshoot is intended to reliably prevent the interference of the machine, and an explanation will be made in which the industrial machine shall be a machine tool. Therefore, in the present embodiment, the same reference symbols are given to the same configuration as in the first embodiment, and detailed description thereof will be omitted.

Figure 4:
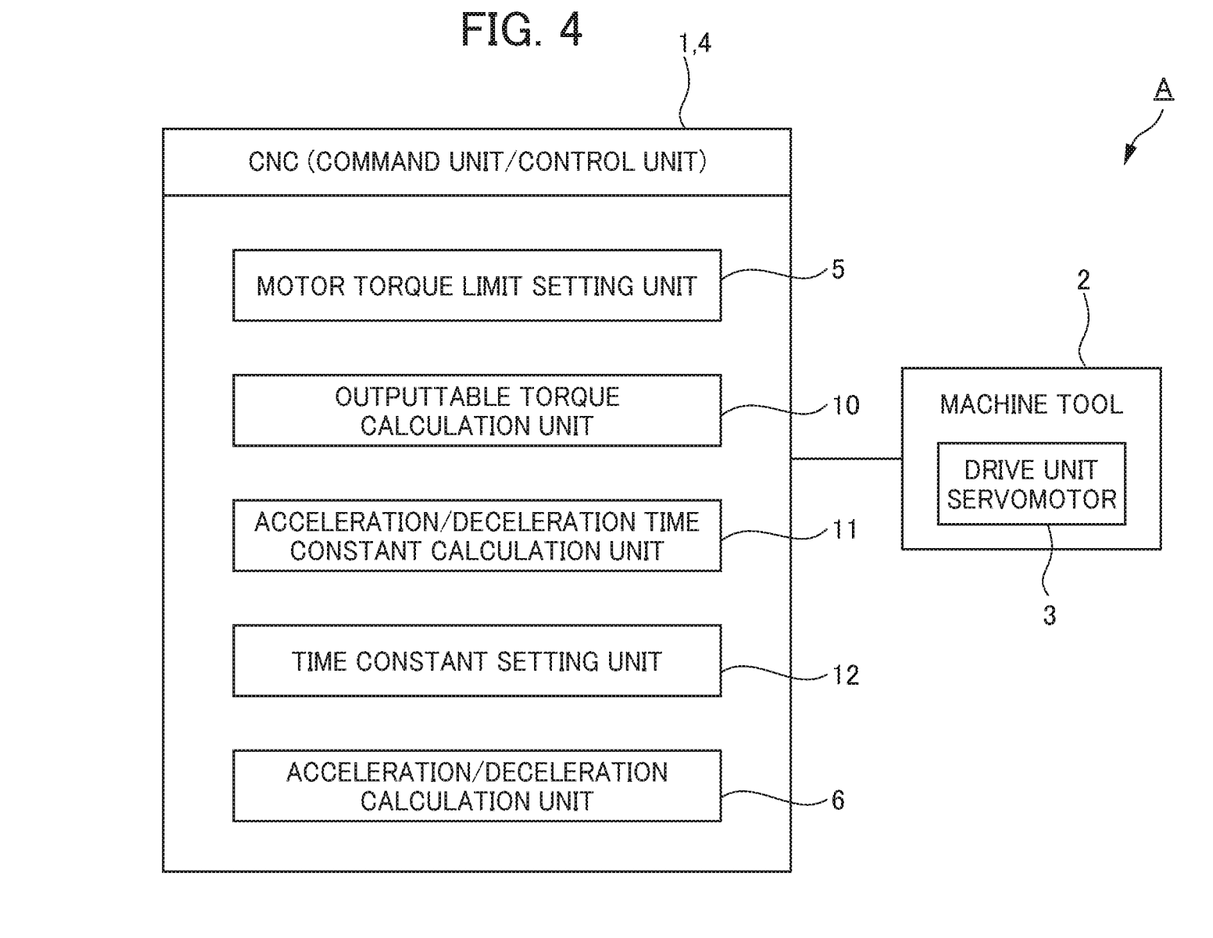
FIG. 4 is a block diagram showing a numerical control system for an industrial machine of a second embodiment.

As shown in FIG. 4, similarly to the first embodiment, a control system A of the machine tool according to the present embodiment includes a CNC 1 of a command unit, and a control unit 4 for controlling a drive unit 3 of a machine tool 2 on the basis of a command of the CNC 1.

On the other hand, as shown in FIG. 4, the control unit 4 of the control system A of the machine tool according to the present embodiment includes: a motor torque limit setting unit 5 for setting a torque limit of a motor 3; an outputtable torque calculation unit 10 for calculating an outputtable torque value of the motor 3; an acceleration/deceleration time constant calculation unit 11 for calculating an acceleration/deceleration time constant; a time constant setting unit 12 for setting the acceleration/deceleration time constant calculated by the acceleration/deceleration time constant calculation unit 11; and an acceleration/deceleration calculation unit 6 for calculating an acceleration/deceleration speed of the motor 3 and thus a table 100.

Here, upon selecting the servomotor to be used, a torque Ta required most (acceleration torque) and the speed Vr when achieving the torque Ta required most (in other words, the rotational speed of the motor when the acceleration torque Ta begins to decrease) are calculated by the following formula (1) and formula (2).

[Math. 1]
$$T_a = V_m \times \frac{2\pi}{60} \times \frac{1}{t_a} \times (J_M + J_L/\eta) \times \left(1 - e^{-k_s \cdot t_a}\right) \quad (1)$$

[Math. 2]
$$V_r = V_m \times \left\{1 - \frac{1}{t_a \cdot k_s}\left(1 - e^{-k_s \cdot t_a}\right)\right\} \quad (2)$$

$V_m$ represents the rotational speed of the motor at rapid traverse, $t_a$ represents the acceleration time, $J_M$ represents the moment of inertia of the motor, $J_L$ represents the moment of inertia of the load, $k_s$ represents the position loop gain, q represents the mechanical efficiency, and e represents the base of the natural logarithm. Furthermore, among them, the acceleration time of $t_a$ is a time constant, and if the torque Ta that can be outputted after the torque limit is determined, it is possible to determine the time constant using the formula (1) and formula (2).

Figure 5:
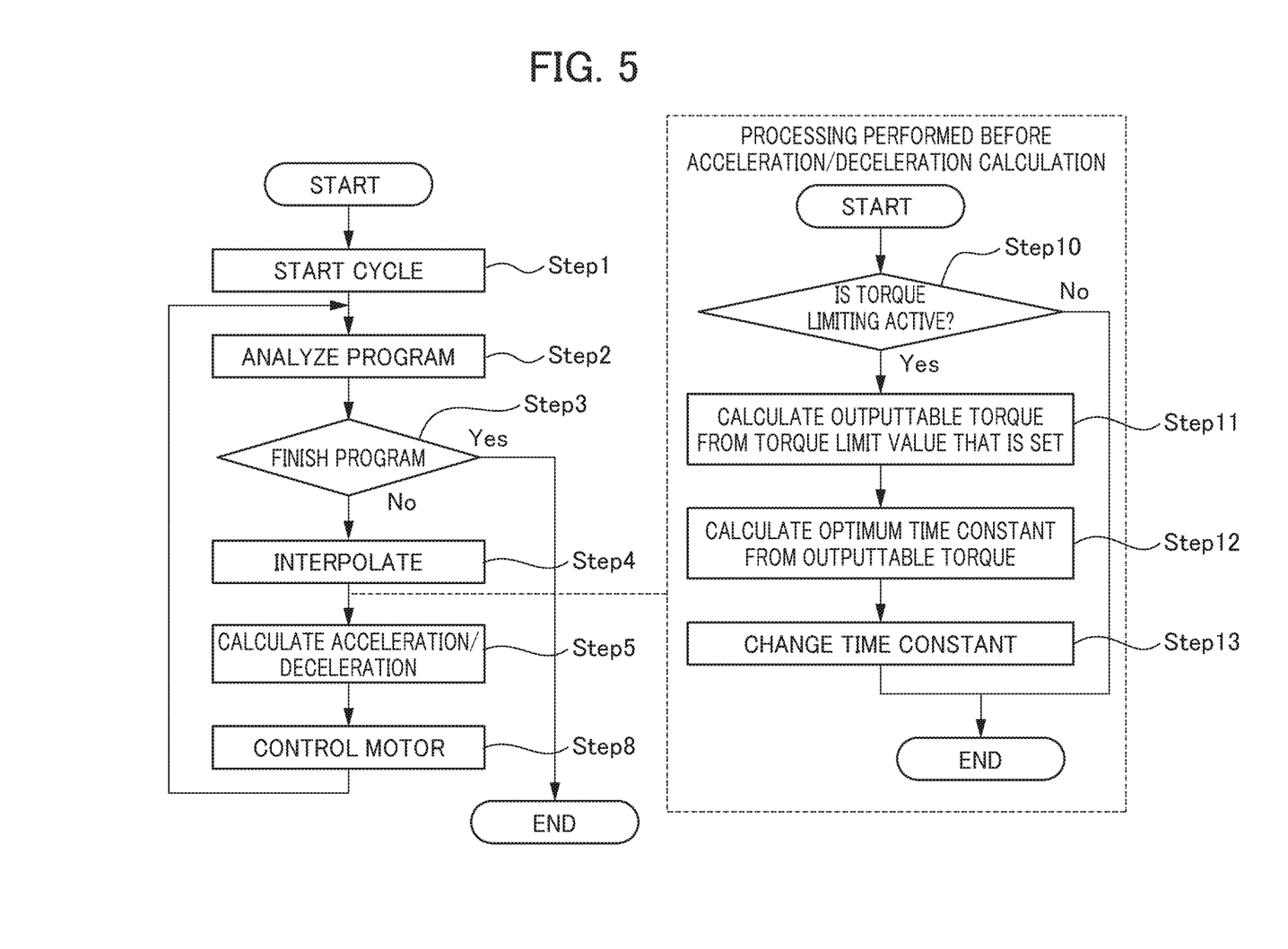
FIG. 5 is a flow diagram showing a control method using the numerical control system for the industrial machine according to the second embodiment.

Based on the configuration described above, in a case in which the control system A of the machine tool according to the present embodiment controls the drive unit 3 of the machine tool 2, as in the first embodiment, when a cycle starts on the basis of a command from the CNC 1 (Step 1), analysis of an NC program (confirmation of progress) is performed (Step 2), and it is confirmed whether or not the program has been completed (Step 3), as shown in FIG. 5.

Furthermore, in a case in which the program has not been finished, an interpolation (Step 4) and a calculation of the acceleration/deceleration of the motor by the acceleration/deceleration calculation unit 6 (Step 5) are performed to control the motor 3 (continue) (Step 8).

On the other hand, at the stage of performing the interpolation (Step 4), the torque limit is set by the motor torque limit setting unit 5 to confirm whether it is valid (Step 10).

In a case in which the torque limit is valid, the outputtable torque calculation unit 10 calculates the outputtable torque ($T_a$) of the motor 3 from a torque limit value that has been set (Step 11).

Furthermore, the acceleration/deceleration time constant calculation unit 11 calculates the optimum time constant ($t_a$) from the outputtable torque (Ta) that has been calculated (Step 12).

Thereafter, the time constant setting unit 12 re-sets and changes the time constant ($t_a$) calculated by the acceleration/deceleration time constant calculation unit 11 (Step 13), and the acceleration/deceleration calculation unit 6 performs the acceleration/deceleration calculation (Step 5) on the basis of the time constant ($t_a$), to control the motor 3 (Step 8).

In the control system A of the machine tool of the present embodiment, in a case of performing the position control (rapid traverse or cutting feed) by commanding the end point position in a program, it is possible to increase the time constant ($t_a$) so that the acceleration/deceleration can be performed within the torque that can be outputted after the torque limitation.

Figure 6:
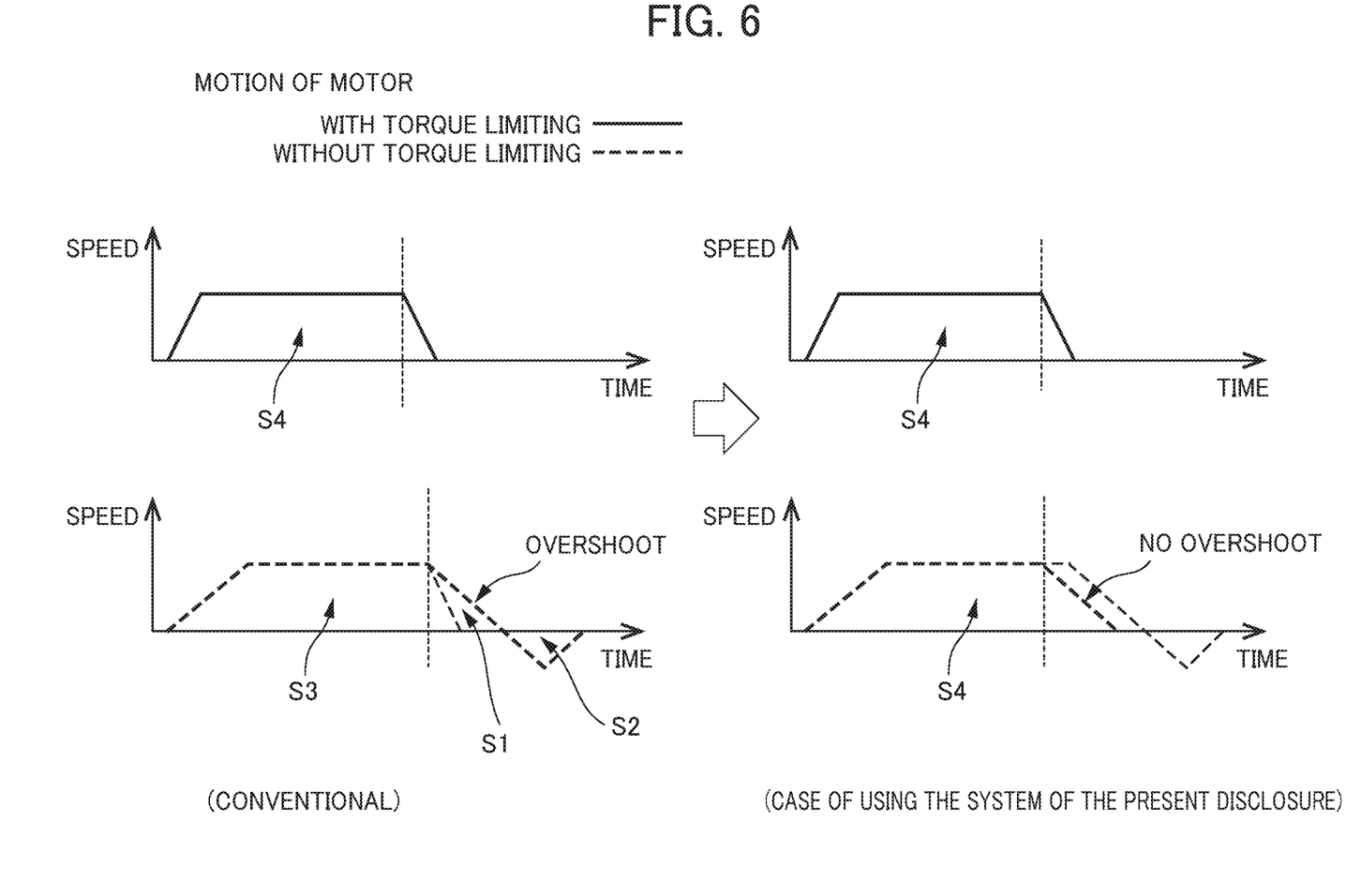
FIG. 6 is a diagram used in an explanation of preventing overshoot using the numerical control system for the industrial machine according to the second embodiment.

In other words, in the control system A of the machine tool of the present embodiment, as shown in the lower right graph of FIG. 6, by optimally setting the time constant ($t_a$) automatically to be large before moving the feed axis, it is possible to start the deceleration earlier in time series, and thus possible to decelerate and stop the motion without overshoot within the limited torque. In addition, since the acceleration/deceleration can be performed according to the command, the position deviation does not increase.

Therefore, according to the control system A of the machine tool of the present embodiment, in a case in which the torque of the motor 3 such as a servomotor used in the feed axis of the machine tool 2 is automatically limited by the command unit of the CNC 1, it is possible to eliminate the overshoot occurring at the time of stopping, thereby reliably preventing interference of the machine.

Furthermore, in the control system A of the machine tool according to the present embodiment, since the acceleration/deceleration can be performed according to the command within the limit torque and the position deviation is not increased, it is possible to eliminate the need to perform processing so as not to generate an alarm of excessive error such as reducing the feed speed or increasing an allowable value of the position deviation.

Figure 7:
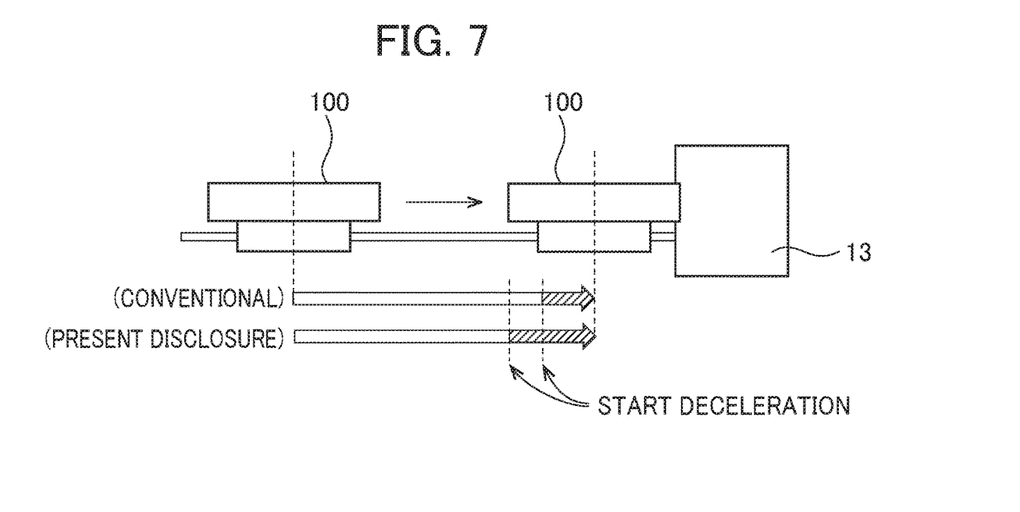
FIG. 7 is a diagram showing an impact reduction effect due to the start of deceleration made early by using the numerical control system of the industrial machine of the second embodiment.

Furthermore, in the control system A of the machine tool of the present embodiment, as shown in FIG. 7, in a case in which the machine 2 is intentionally pressed against a stopper or the like during deceleration in an automatic operation, since the deceleration is started earlier than conventionally, the speed at the time of pressing can be made slower than in the conventional manner.

Although the second embodiment of the numerical control system of an industrial machine has been described above, the present invention is not limited to one of the embodiments described above, and the present invention can be modified where appropriate within a scope not deviating from the spirit thereof, including modifications of the first embodiment.

EXPLANATION OF REFERENCE NUMERALS

1 CNC (command unit)
2 machine tool
3 drive unit (motor)
4 control unit
5 motor torque limit setting unit
6 acceleration/deceleration calculation unit
7 deceleration detection unit
8 in-deceleration torque limit release unit
10 outputtable torque calculation unit
11 acceleration/deceleration time constant calculation unit
12 time constant setting unit
A numerical control systems of industrial machine (control systems of machine tool)

What is claimed is:
1. A numerical control system of an industrial machine, the numerical control system comprising:
   a command unit; and
   a control unit configured to control driving of a motor of the industrial machine in accordance with a first com- mand from the command unit, and to perform position control by receiving a second command of an end point position from the command unit or without receiving the second command of the end point position from the command unit, wherein the control unit includes an in-deceleration torque limit release unit that, in a case of performing torque limitation of the motor, releases the torque limitation to increase torque output only during deceleration.

2. A numerical control system of an industrial machine, the numerical control system comprising:

a command unit; and a control unit configured to control driving of a motor of the industrial machine in accordance with a command from the command unit, and to perform position control by receiving a command of an end point position from the command unit, wherein the control unit includes:

an acceleration/deceleration time constant calculation unit that, in a case of performing torque limiting of the motor, performs acceleration/deceleration at an outputtable torque after torque limiting, and calculates a time constant of acceleration/deceleration for securing the position control; and a time constant setting unit that, in a case of performing the torque limiting of the motor, automatically sets the time constant of the acceleration/deceleration calculated by the acceleration/deceleration time constant calculation unit before driving the motor.

* * * * *